(12) United States Patent
Takayanagi et al.

(10) Patent No.: US 8,874,385 B2
(45) Date of Patent: Oct. 28, 2014

(54) RADIATION DETECTOR AND VERIFICATION TECHNIQUE OF POSITIONING ACCURACY FOR RADIATION DETECTOR

(75) Inventors: Taisuke Takayanagi, Hitachi (JP); Hideaki Nihongi, Hitachi (JP); Yusuke Fujii, Hitachi (JP); Hiroshi Akiyama, Hitachiohta (JP); Masahiro Tadokoro, Hitachiohta (JP); Rintaro Fujimoto, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 714 days.

(21) Appl. No.: 13/013,018

(22) Filed: Jan. 25, 2011

(65) Prior Publication Data
US 2011/0231147 A1 Sep. 22, 2011

(30) Foreign Application Priority Data

Jan. 26, 2010 (JP) .................................. 2010-013738

(51) Int. Cl.
G01T 1/00 (2006.01)
G01T 1/29 (2006.01)
G01T 1/185 (2006.01)
G01T 1/24 (2006.01)

(52) U.S. Cl.
CPC .................. *G01T 1/29* (2013.01); *G01T 1/2935* (2013.01); *G01T 1/185* (2013.01); *G01T 1/241* (2013.01)
USPC ............. 702/40; 702/104; 702/150; 702/153; 250/336.1; 250/361 R; 250/370.01

(58) Field of Classification Search
USPC .......................................... 702/40, 150, 153
See application file for complete search history.

(56) References Cited

U.S. PATENT DOCUMENTS

| 3,603,797 | A | * | 9/1971 | Borkowski et al. | ........... 250/379 |
| 3,818,221 | A | * | 6/1974 | Kaminskas | ........................ 378/1 |
| 3,942,012 | A | | 3/1976 | Boux | |
| 4,476,390 | A | * | 10/1984 | Hanawa | ..................... 250/385.1 |
| 4,870,265 | A | * | 9/1989 | Asmussen et al. | ......... 250/214.1 |
| 5,672,878 | A | * | 9/1997 | Yao | ............................. 250/385.1 |
| 7,141,797 | B2 | * | 11/2006 | Yokoi et al. | ................ 250/370.1 |

(Continued)

FOREIGN PATENT DOCUMENTS

JP 49-107284 10/1974

OTHER PUBLICATIONS

C. Brusasco et al., A dosimetry system for fast measurement of 3D depth-dose profiles in charged-particle tumor therapy with scanning techniques, Nuclear Instruments and Methods in Physics Research B 168, 2000, pp. 578-592.

(Continued)

*Primary Examiner* — Sujoy Kundu
*Assistant Examiner* — Paul D Lee
(74) *Attorney, Agent, or Firm* — Mattingly & Malur, PC

(57) ABSTRACT

The present invention provides, at low cost, a multilayer radiation detector whose position relative to a beam axis can be verified. The radiation detector includes a plurality of sensors that react to radiation and are stacked in parallel inlayers in a traveling direction of the radiation. The sensors are each sectioned into a central region including the center of the sensor and another region surrounding the central region. The radiation detector independently measures signals measured by the central regions and signals measured by the other regions. Thus, the position of the radiation detector can be verified.

13 Claims, 7 Drawing Sheets

(56) References Cited

U.S. PATENT DOCUMENTS

2004/0114122 A1* 6/2004 Teeuwen .................. 355/68
2006/0049362 A1* 3/2006 Friedman et al. ............ 250/374
2008/0210878 A1* 9/2008 Friedman .................. 250/374

OTHER PUBLICATIONS

R. Cirio et al., Two-dimensional and quasi-three-dimensional dosimetry of hadron and photon beams with the Magic Cube and the Pixel Ionization Chamber, Physics in Medicine and Biology, 49, 2004, pp. 3713-3724.

K. Yajima et al., Development of a multi-layer ionization chamber for heavy-ion radiotherapy, Physics in Medicine and Biology, 54, 2009, N107-N114.

D. Nichiporov et al., Multichannel detectors for profile measurements in clinical proton fields, Med. Phys. 34 (7), Jul. 2007, pp. 2683-2690.

Zebra with OmniPro-Incline, High precision Particle Therapy Dosimetry, IBA Dosimetry Particle Therapy Dosimetry.

JP Office Action in JP App. No. 2010-013738, dated Sep. 3, 2013.

* cited by examiner

RADIATION DETECTOR AND VERIFICATION TECHNIQUE OF POSITIONING ACCURACY FOR RADIATION DETECTOR

BACKGROUND OF THE INVENTION

1. Field of the Invention

The present invention relates to a radiation detector and a method for verifying the accuracy of positioning of a radiation detector.

2. Description of the Related Art

A scanning method is being widely used as an irradiation method for a particle therapy. In the scanning method, a target volume is sectioned into fine regions (spots) which are each irradiated with a beam with a small diameter (of 3 mm to 20 mm). After the spot is irradiated with a prescribed amount of radiation, the irradiation is stopped and the next specified spot is scanned with the beam. In order to change a spot to be irradiated in a direction (hereinafter referred to as a lateral direction) perpendicular to a traveling direction (hereinafter also referred to as a depth direction) of the beam, the irradiation position of the beam is changed by scanning magnets. After all spots that exist in a certain depth region are each irradiated with the prescribed amount of radiation, a spot to be irradiated is changed in the depth direction. In order to change the spot to be irradiated in the depth direction, the energy of the beam is changed by an accelerator or a range shifter. Finally, all spots included in the target volume to be irradiated are each irradiated with the same dose.

A proton irradiation system that uses the scanning method is adjusted so that a beam forms a Bragg curve in water for each of spots. This is due to the fact that a main component of a human body to be irradiated by the proton irradiation system is water. The Bragg curve is a distribution of linear energy transfer (LET) (J/m) in the depth direction. The LET is energy that is transferred to a medium for a time period for which a single beam particle travels a unit distance in the medium in the depth direction.

In order to verify the Bragg curve formed after the adjustment, a water phantom in which a radiation detector is installed is used. The radiation detector can be driven by a motor so that the radiation detector moves in the waver phantom in the depth direction. A physical quantity that can be directly measured by the radiation detector is the amount (C) of ionization that occurs in a sensitive region of the radiation detector due to the beam. An absorbed dose D (J/kg) to water is calculated by multiplying the amount of the ionization by a calibration factor. The calculated dose D is an average value in a water equivalent volume of the sensitive region. The water equivalent volume is expressed by multiplying the area S of the medium in the lateral direction by a water equivalent thickness in the depth direction. The water equivalent thickness is a thickness (of water) that causes equivalent energy loss of radiation when the medium is replaced with water. The dose D is expressed by the following equation: $D = LET \times \Phi / \rho$, where $\Phi$ is the average density ($1/m^2$) of particles incident on the sensitive region, and $\rho$ is the density ($kg/m^3$) of water. In order to convert a distribution of the dose D into the Bragg curve or a distribution of the LET, it is necessary that the average density $\Phi$ in the depth direction be constant.

When the number of particles incident on the sensitive region is n, $\Phi = n/S$. When all parts of a beam, which disperse in the lateral direction, can be captured, the number n is constant and $\Phi$ is also constant. The radiation detector that is installed in the water phantom and designed to measure a Bragg curve has a sensitive region with a sufficient large area that can capture all the beam parts dispersing in the lateral direction. The water phantom is irradiated with a beam by an irradiation system to be adjusted, the radiation detector is scanned with the beam, and points of a Bragg curve in water are measured on a point basis. In the measurement of the Bragg curve using the water phantom, it takes an immense amount of time to scan the radiation detector.

Non-Patent Document 1 (C. Brusasca, et al., "A dosimetry system for fast measurement of 3D depth dose profiles in charged-particle tumor therapy with scanning techniques" Nucl. Instr. And. Meth. in Phys. Res. B 168 (2000) 578-592) discloses a multilayer radiation detector that measures a Bragg curve of a heavy ion beam at one time. The multilayer radiation detector has a structure in which many ionization chambers are stacked in parallel inlayers in the depth direction. The ionization chambers form the radiation detector that have a structure in which an ionization layer (whose material is rare gas or air) serves as a sensitive region and is sandwiched between two electrodes. A high voltage is applied to one of the electrodes so that a uniform electric field is formed in the sensitive region and then, the ionization chambers collect ionization charges that are generated in the sensitive region during passage of the beam. When a solid phantom that is inserted between the ionization chambers is removed, a measurement interval of a distribution is equal to a water equivalent thickness of a single ionization layer. When it is necessary to reduce the measurement interval, a range shifter is inserted on an upstream side so that the position of a spot to be measured is changed in the depth direction. The measurement interval varies for each of measurement conditions. For example, the measurement interval needs to be 0.2 mm under the condition of a low-energy beam in some cases. In this case, when a water equivalent thickness of a single ionization chamber is 1.0 mm, the thickness of the range shifter is changed to 0.2 mm, 0.4 mm, 0.6 mm and 0.8 mm so that the measurement needs to be repeated five times.

Non-Patent Document 2 (R. Cirio, et al., "Two-dimensional and quasi three dimensional dosimetry of hadron and photon beams with the Magic Cube and the Pixel Ionization Chamber" Phys. Med. Biol. 49 (2004) 3713-3724) also discloses a multilayer radiation detector that measures a Bragg curve of a heavy ion beam at one time. The radiation detector disclosed in Non-Patent Document 2 has ionization chambers that each include two electrodes. One of the two electrodes is divided into 64 strip-like portions. Ionization charges that are generated in a sensitive region are collected for each of the positions of the strip-like portions and added to a Bragg curve so that a size of the beam in the lateral direction in each of layers is calculated.

SUMMARY OF THE INVENTION

In order to accurately calculate a Bragg curve of a beam by using a multilayer radiation detector, it is necessary that the multilayer radiation detector is arranged so that layers of the multilayer radiation detector are stacked in parallel in a traveling direction of a beam. In addition, in order to capture the beam spreading in the lateral direction as much as possible, it is preferable that the center of each of ionization layers that are sensitive regions of the multilayer radiation detector match the central axis of the beam. Traditionally, a laser marker of an irradiation room is used in order to position the multilayer radiation detector. However, the laser marker does not necessarily accurately indicate a straight line that extends through the central axis of the beam.

In order to verify that the radiation detector disclosed in Non-Patent Document 1 is arranged at a desired position with respect to the beam or arranged so that the central axis of the beam matches the centers of sensors of the layers, it is necessary to install a device (such as radiochromic dosimetry film) that is capable of measuring a lateral size of the beam. Two or more films are installed on the path of the beam to measure the central axis of the beam and an incident angle of the beam on the detector. The positional relationship between the detector and the beam can be verified on the basis of the measurement results. The operation of verifying the installed position of the radiation detector using the films takes a long time and is laborious for an operator.

On the other hand, since the radiation detector disclosed in Non-Patent Document 2 is capable of measuring a lateral size of the beam by itself, it is not necessary to install a film in order to verify the installed position of the radiation detector. However, since an electrode is divided into small pieces, the number of charge collection channels is increased in the radiation detector. As a result, the radiation detector is expensive.

According to the present invention, a radiation detector has a plurality of sensors that react to radiation and are stacked in parallel inlayers in a traveling direction of radiation. The sensors each have a central region (region A) and a region (region B) surrounding the central region. The sensors each independently collect detection signals of radiation through the regions A and B. In this manner, the present invention solves the aforementioned problems.

The radiation detector calculates a standard deviation of lateral dose distribution (beam size $\sigma$) for each of the layers on the basis of the ratio of signals output from the regions A and signals output from the regions B. When the beam size $\sigma$ quadratically increases in the traveling direction of the radiation, it is determined that the radiation detector is arranged so that the layers of the radiation detector are stacked in parallel in the traveling direction of the beam and the central axis of the beam matches the centers of the sensors of the layers.

Another method using the radiation detector according to the present invention in order to verify the installed position of the radiation detector is described. First, while verifying the position of the radiation detector by using a radiochromic dosimetry film or the like, the radiation detector is accurately arranged at the aforementioned desired position, that is, arranged so that the layers of the radiation detector are stacked in parallel in the traveling direction of the beam and the central axis of the beam matches the centers of the sensors of the layers. In this state, the radiation detector is irradiated with the beam, measures the ratio of signals output from the regions A and the regions B for each of the layers, and records the measured ratio as reference data for each of the layers. From the next test, the radiation detector is irradiated with the beam under the same irradiation condition as a condition used at the time of acquisition of the reference data, and the radiation detector measures the ratio of signals output from the regions A and the regions B. When the measurement results match the reference data, it is determined that the radiation detector is arranged so that the layers of the radiation detector are stacked in parallel in the traveling direction of the beam and the central axis of the beam matches the centers of the sensors of the layers.

DESCRIPTION OF THE PREFERRED EMBODIMENTS

Embodiments of the present invention are described below with reference to the accompanying drawings.

First Embodiment

A radiation detector according to the first embodiment of the present invention is described with reference to FIG. 1. In order to conduct a performance assessment of and adjust the proton irradiation system 102 that uses a scanning method, the radiation detector 101 according to the first embodiment measures a Bragg curve that is formed in water by a beam irradiated from the proton irradiation system 102. The proton irradiation system 102 is one of radiation irradiation systems. In the present embodiment, as a radiation irradiation system, the proton irradiation system 102 is described as an example. A heavy ion irradiation system that uses a particle (carbon beam or the like) having a larger mass than a proton can be used as the radiation irradiation system. In this case, the radiation detector measures a Bragg curve that is formed in water by a heavy ion beam irradiated from the heavy ion irradiation system.

Figure 1:
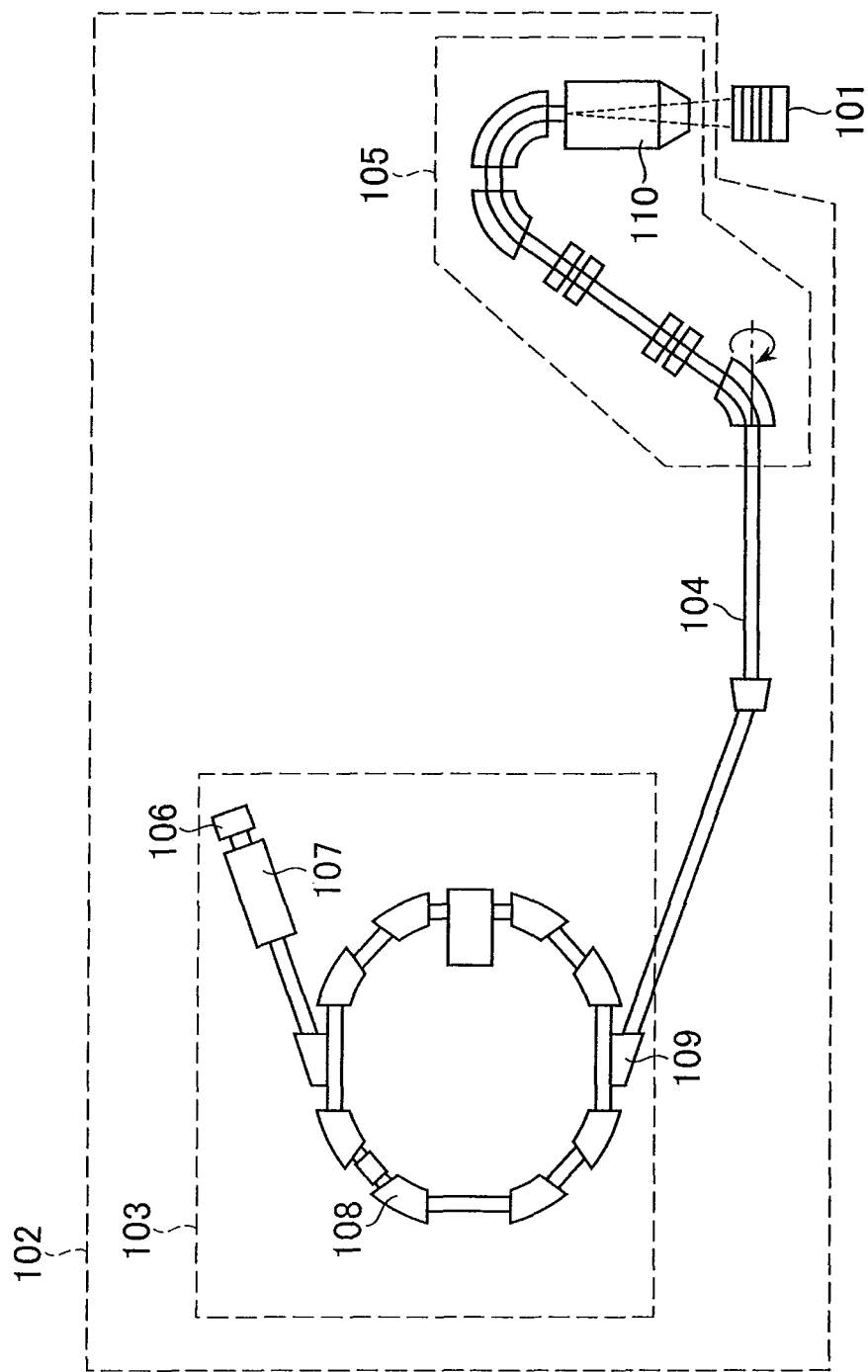
FIG. 1 is a diagram showing an example in which a radiation detector according to a preferred embodiment of the present invention is applied to a proton irradiation system.

As shown in FIG. 1, the proton irradiation system 102 includes a proton beam generator 103, a proton beam transport unit 104 and a rotating irradiation system 105. In the present embodiment, the rotating irradiation system 105 that has a rotating gantry is described as an example. However, the irradiation system may be of a fixed type.

The proton beam generator 103 includes an ion source 106, a preaccelerator 107 (for example, a linear accelerator) and a synchrotron 108. The ion source 106 generates a proton. The generated proton is accelerated by the preaccelerator 107. Then, the proton (hereinafter referred to as a beam) is extracted from the preaccelerator 107. The extracted beam is accelerated by the synchrotron 108 so that the beam has predetermined energy. After that, the beam is extracted from an extraction deflector 109 into the proton beam transport unit 104. Then, the beam passes through the rotating irradiation system 105 and reaches the radiation detector 101 so that the radiation detector 101 is irradiated with the beam. The rotating irradiation system 105 includes the rotating gantry (not shown) and an irradiation nozzle 110. The irradiation nozzle 110 is installed in the rotating gantry and rotates with the rotating gantry. A part of the proton beam transport unit 104 is attached to the rotating gantry. In the present embodiment, the synchrotron 108 is used as an accelerator that accelerates the proton beam. A cychrotron or a linear accelerator may be used instead of the synchrotron 108.

The outline of the scanning method that is achieved by the irradiation nozzle 110 according to the present embodiment is described. In the scanning method, a target volume is sectioned into small regions (spots), and the spots are each irradiated with the beam on a spot basis. A lateral dose distribution of each of beams can be approximated using a two-dimensional normal distribution. After the spot is irradiated with a prescribed amount of radiation, the irradiation is stopped and the beam is controlled to travel toward the next planned spot so that the next planned spot is irradiated with the beam. In order to change a spot to be irradiated in the lateral direction, two pairs of scanning magnets (not shown) that are arranged in the irradiation nozzle 110 are used to change the irradiation position of the beam. After all spots that exist in a certain depth region are each irradiated with the prescribed amount of radiation, a spot to be irradiated is changed in the depth direction by changing the energy of the beam by using the synchrotron 108 or a range shifter (not shown) installed in the irradiation nozzle 110 or the like. This process is repeated so that all spots are each irradiated with the same dose. In the present embodiment, a straight line through which the central axis of the beam extends while the scanning magnets are not excited is called a beam axis. An intersection of the rotational axis of the rotating irradiation system 105 with the beam axis is called an isocenter. In the scanning method, a standard deviation of lateral dose distribution (beam size σ) is in a range of 3 mm to 20 mm in the vicinity of the isocenter. When the beam size σ of the beam incident on the radiation detector 101 quadratically increases as the beam travels in the depth direction, the beam size σ can be approximated.

Figure 2:
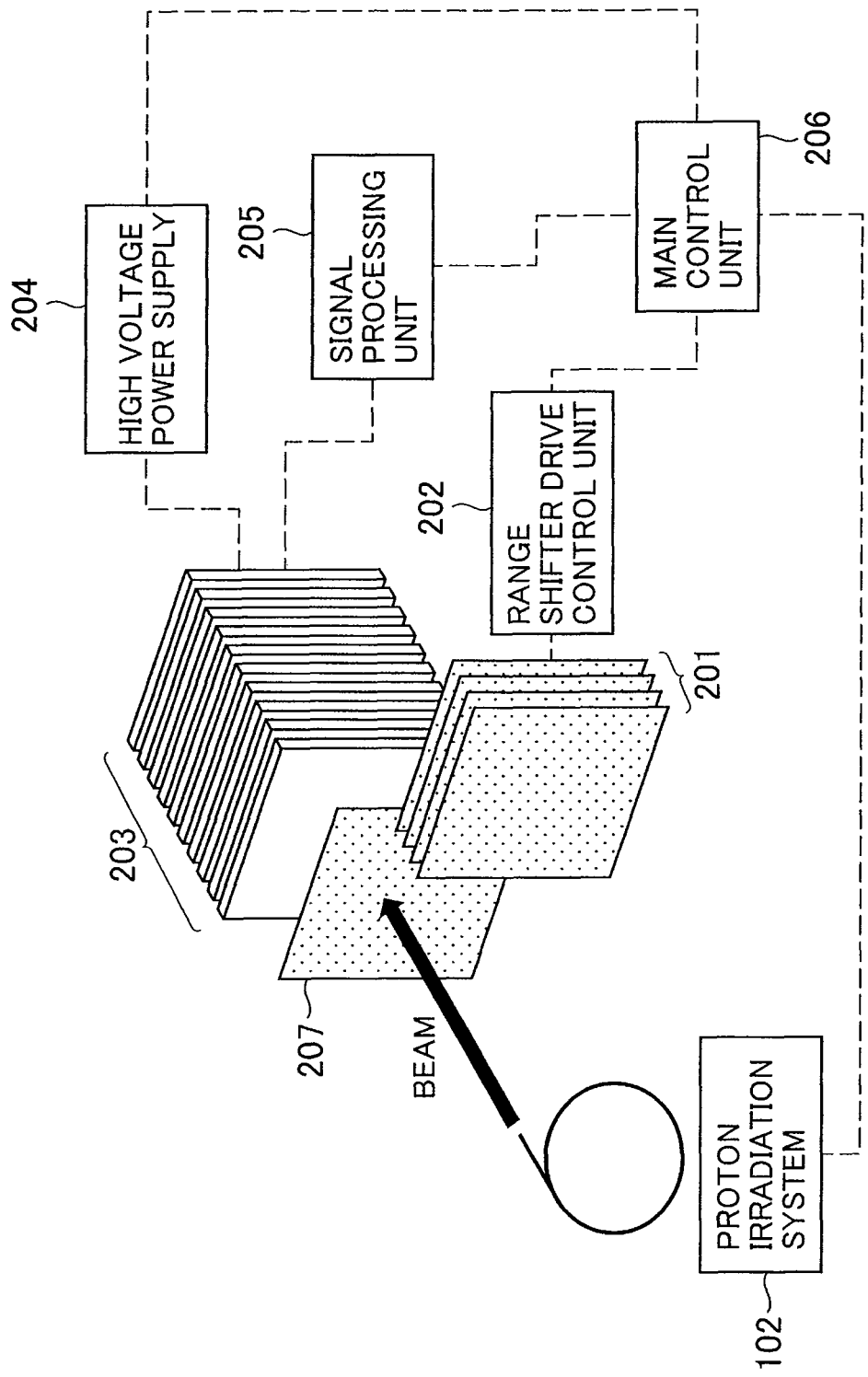
FIG. 2 is a diagram showing a configuration of the radiation detector shown in FIG. 1.

A structure of the radiation detector 101 is described below with reference to FIG. 2. The radiation detector 101 includes a range shifter 201, a range shifter drive control unit 202, a sensor unit 203, a high voltage power supply 204, a signal processing unit 205 and a main control unit 206.

The range shifter 201 is arranged on the upstream side of the sensor unit 203 in the depth direction and changes a measuring position of the radiation detector 101 in the depth direction according to an adjustment of and to a performance assessment of the proton irradiation system 102. The range shifter 201 includes a plurality of energy absorbers 207 that have different thicknesses. In the present embodiment, for example, the energy absorbers 207 includes seven kinds of thickness of 0.1 mm, 0.2 mm, 0.4 mm, 0.8 mm, 1.6 mm, 3.2 mm and 6.4 mm. One or more of the energy absorbers 207 is arranged on the path of the beam so as to reduce the energy of the beam and change the measuring position of the radiation detector 101 in the depth direction. The range shifter 201 according to the present embodiment can change the measuring position of the radiation detector 101 in the depth direction at intervals of 0.1 mm. The measuring position of the radiation detector 101 can be changed from 0.1 mm to 12.7 mm. The material and thicknesses of the energy absorbers 207 can be arbitrarily selected according to the adjustment of and the performance assessment of the proton irradiation system 102. In the present embodiment, acrylonitrile butadiene styrene (ABS) resin is used as the material of the energy absorbers 207. The ratio of radiation stopping power of the ABS to radiation stopping power of water is set to 1. The range shifter drive control unit 202 drives and controls the range shifter 201 so that at least one of the energy absorbers 207, which has a desired thickness, is arranged on the upstream side of the sensor unit 203.

Figure 3:
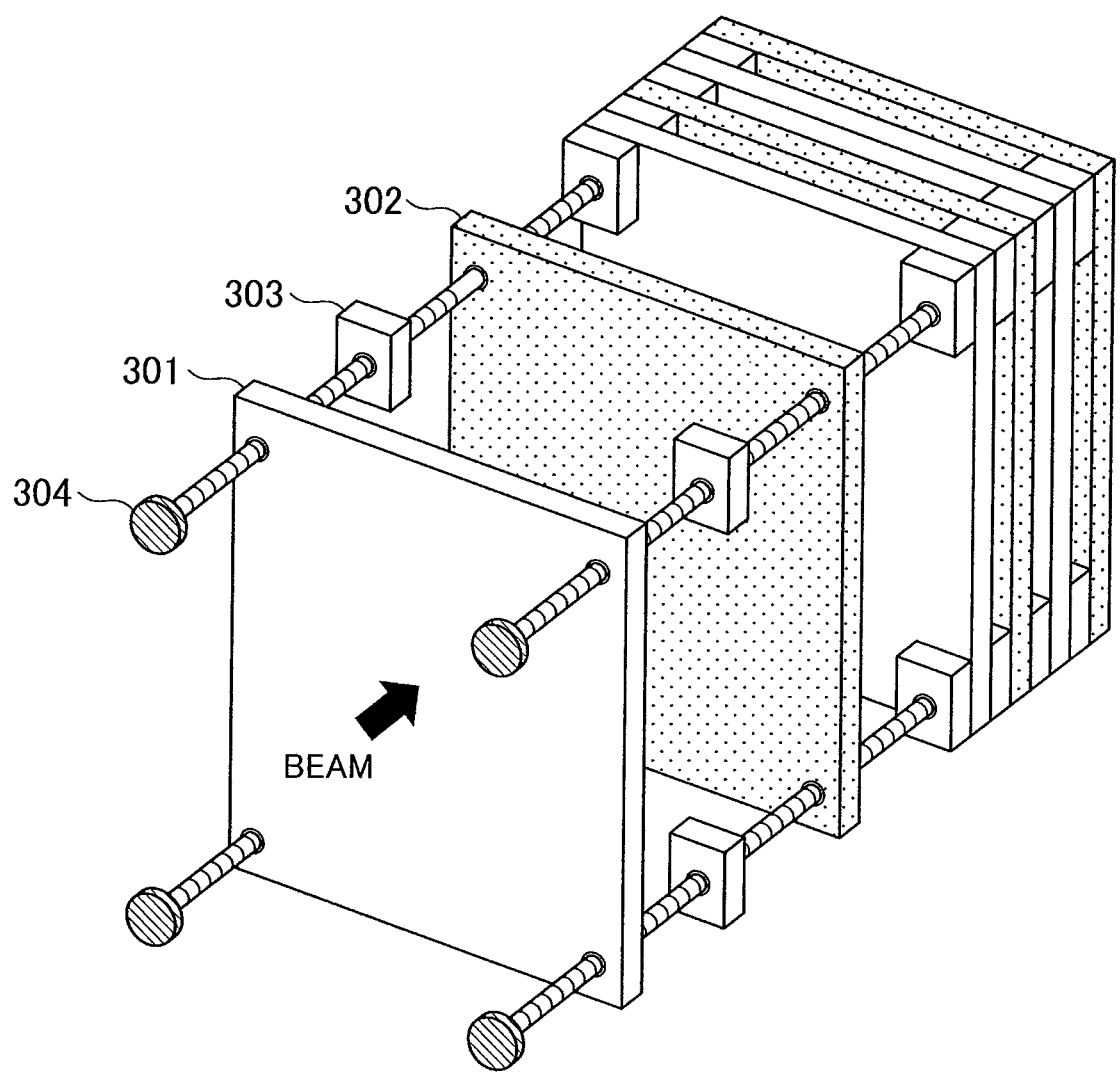
FIG. 3 is a diagram showing a configuration of a sensor unit shown in FIG. 2.

As shown in FIG. 3, the sensor unit 203 has a structure in which printed circuit boards A 301 for charge collection and printed circuit boards B 302 for assigning a high voltage are alternately stacked in parallel in the depth direction. A spacer 303 is inserted between the boards 301 and 302 to form an ionization layer or a sensitive region for radiation. Each of the spacers 303 is an insulating body. The ionization layers are filled with ionized gas. In the present embodiment, the ionization layers are exposed to air, and the air is used as the ionized gas. When the ionization layers are sealed and ionized gas such as argon is circulated using an external gas pump, the same effect can be obtained. The boards 301, 302 and the spacers 303 are stacked and fixed using bolts 304. In the present invention, the bolts 304 may not be used as long as the boards 301, 302 and the spacer 303 can be stacked and fixed in a stable manner. The boards 301 and 302 are glass epoxy boards in which electrodes are evaporated on their surfaces which are perpendicular to the depth direction. The electrodes are copper plated with nickel and gold. The boards are not limited to the glass epoxy boards as long as the boards are insulating bodies. The electrodes are not limited to copper as long as the electrodes are conducting bodies.

Figure 4:
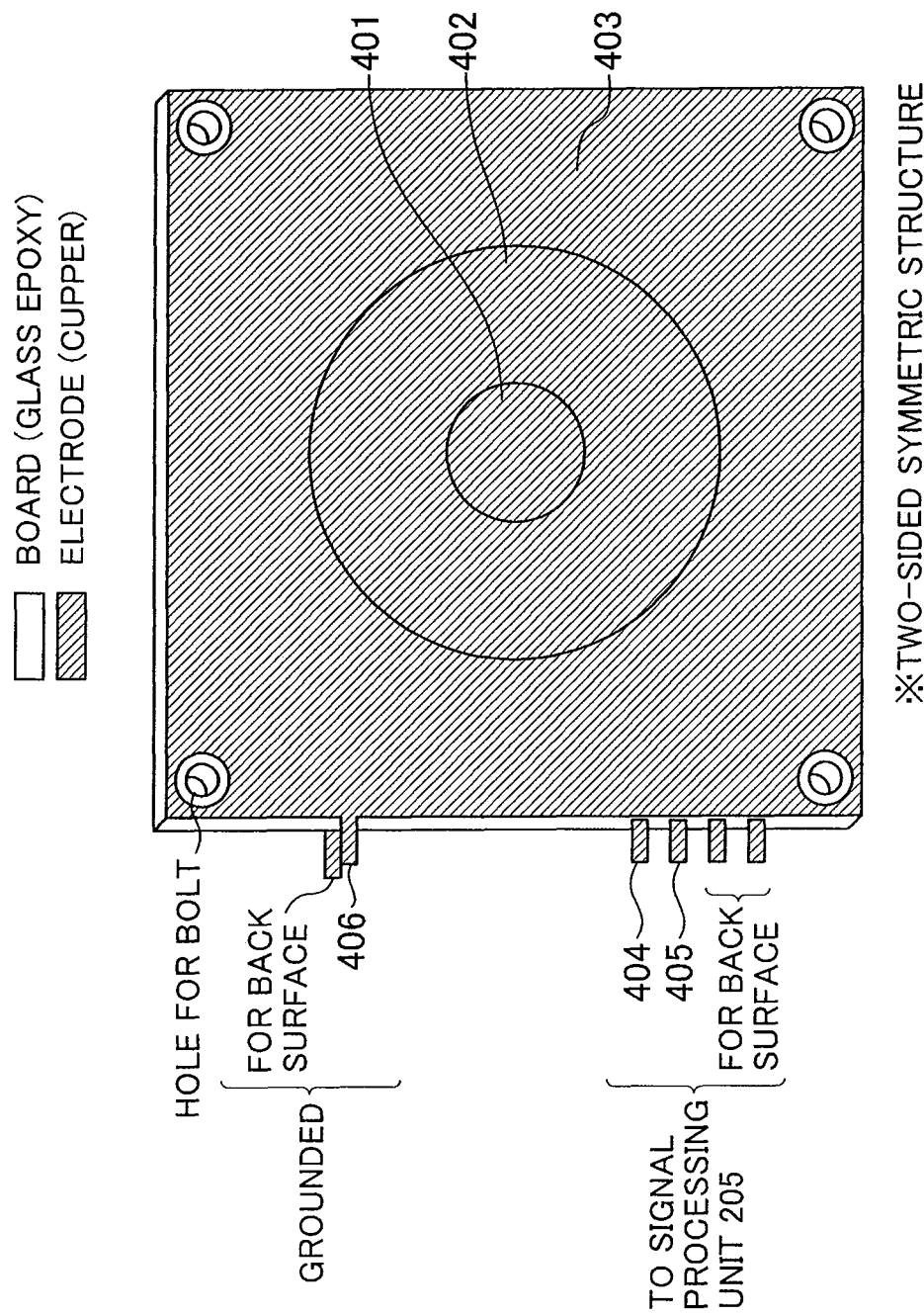
FIG. 4 is a diagram showing a printed circuit board for charge collection, which is shown in FIG. 3.

As shown in FIG. 4, the electrode of the board A 301 is electrically sectioned into three regions. In the present embodiment, a region (central region) that includes the center of the board A 301 is called a small electrode (first electrode) 401; a region that surrounds the small electrode 401 is called a large electrode (second electrode) 402; and the outermost region of the electrode of the board A 301 is called a guard electrode (third electrode) 403. The small electrode 401 is connected to a conductor 404. The large electrode 402 is connected to a conductor 405. The guard electrode 403 is connected to a conductor 406. In this manner, the regions of the electrode are independently connected to the conductors 404, 405 and 406, respectively. Another end of the conductor 404 connected to the small electrode 401 and another end of the conductor 405 connected to the large electrode 402 are both connected to an input side of the signal processing unit 205 through an internal layer of the board A 301. In other words, the conductor 404 connects the small electrode 401 to the signal processing unit 205, and the conductor 405 connects the large electrode 402 to the signal processing unit 205. The signal processing unit 205 integrates charges that are input for a predetermined time period and transmits the integrated value to the main control unit 206. One end of the conductor 406 that is connected to the guard electrode 403 is grounded. The guard electrode 403 prevents a current from leaking from the board B 302 to the small electrode 401 and the large electrode 402. In the present embodiment, the electrode of the board A 301 is sectioned into the three regions to form a dual concentric structure. The electrode that collects charges generated in the ionization layer is electrically sectioned into the central region and the region surrounding the central region. When the regions can independently collect charges, the same effect as the present embodiment can be obtained. The electrode of the board A 301 has a two-sided symmetric structure. In the same manner as a front surface of the electrode of the board A 301, the electrode of the board A 301 collects charges from the ionization layer that faces a back surface of the electrode of the board A 301. The electrode that is constituted by the small electrode 401 and the large electrode 402 has a sufficient area and a sufficient shape so that the electrode can capture the beam that spreads (or disperses in a range of 3 mm to 20 mm) according to a two-dimensional normal distribution in the lateral direction due to scattering and drift in the radiation detector 101 and that is used in the scanning method.

Figure 5:
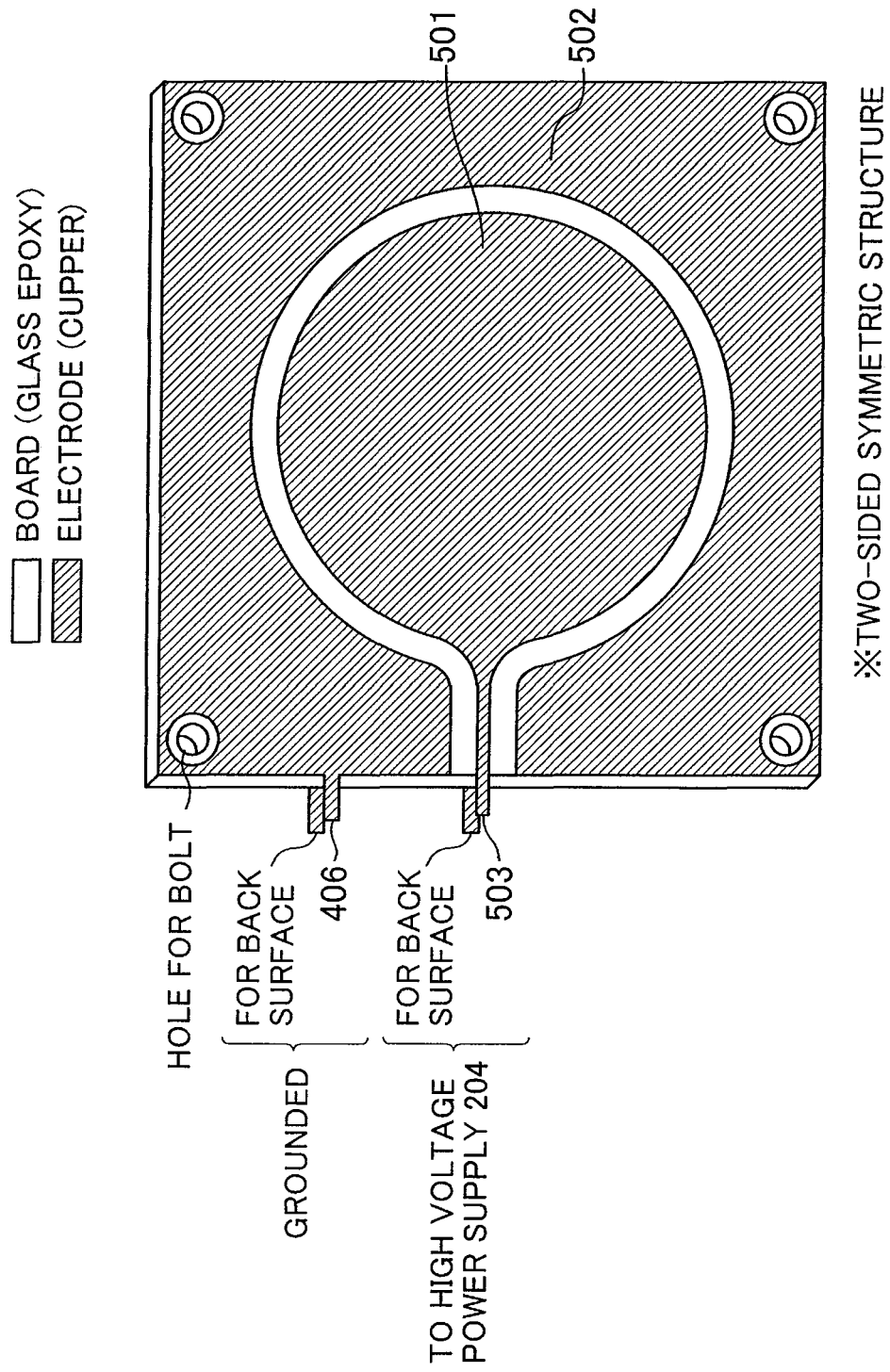
FIG. 5 is a diagram showing a printed circuit board for applying a high voltage, which is shown in FIG. 3.

As shown in FIG. 5, the electrode of the board B 302 is electrically sectioned into two regions. In the present embodiment, a central region of the electrode of the board B 302 is called a high voltage electrode 501, and an outer region of the electrode of the board B 302 is called a guard electrode 502. The high voltage electrode 501 is connected to a conductor 503. The guard electrode 502 is connected to a conductor 504. In this manner, the regions of the electrode are independently connected to the conductors 503 and 504, respectively. The conductor 503 connects the high voltage electrode 501 to the high voltage power supply 204. A high voltage (absolute value of several thousand volts or less) is applied to the high voltage electrode 501 from the high voltage power supply 204. One end of the conductor 504 that is connected to the guard electrode 502 is grounded. The guard electrode 502 prevents a current from leaking from the board B 302 to the small electrode 401 and large electrode 402 of the board A 301. The electrode of the board B 302 has a two-sided symmetric structure. In the same manner as a front surface of the electrode of the board B 302, a high voltage is applied to a back surface of the high voltage electrode. Voltages of the small electrode 401 and large electrode 402 of the board A 301 are approximately 0 volts. An electric field is formed in each of the ionization layers.

A process of measuring a Bragg curve, which uses the radiation detector 101 according to the present embodiment, is described below. First, an operator carries the radiation detector 101 into an irradiation room (not shown) of the proton irradiation system 102 and fixes the radiation detector 101 above a couch (not shown) for patient. Next, the couch for patient is moved with reference to a laser marker for positioning of a patient so that the radiation detector 101 is temporarily positioned. In the present embodiment, the radiation detector 101 is positioned so that the beam axis extends through the centers of the small electrodes 401 of the layers. A jig that is dedicated to positioning of the radiation detector 101 may be manufactured and used instead of the couch for patient.

After the temporary positioning, the operator moves from the irradiation room to a control room (not shown). In the control room, the main control unit 206 controls a measurement by the radiation detector 101 and beam irradiation by the proton irradiation system 102. First, the operator operates the main control unit 206 to turn on the range shifter drive control unit 202, the high voltage power supply 204 and the signal processing unit 205. A high voltage is applied to each of the high voltage electrodes 501 of the boards B 302 so that an electric field is formed in each of the ionization layers. In the present embodiment, a negative high voltage with respect to a ground voltage of 0 volts is applied to each of the high voltage electrodes 501. All the energy absorbers 207 of the range shifter 201 stand by while being separated from the path of the beam.

The operator sets a desired measurement interval on the main control unit 205. In the present embodiment, the measurement interval is set to 0.2 mm on the assumption that a Bragg curve is measured under the condition of low beam energy. The original measurement interval of the radiation detector 101 or the water equivalent thickness of a single ionization layer is set to 1.0 mm. Since the amount of energy loss of air can be ignored, a water equivalent thickness of a single board is 1.0 mm. In the present embodiment, however, a water equivalent thickness of the board A 301 and a water equivalent thickness of the board B 302 are equal to each other. The operator uses the main control unit 206 to set irradiation conditions (beam energy, the position of a spot to be irradiated, the number of spots to be irradiated and the like) of the proton irradiation system 102 and instruct the system 102 to start beam irradiation. In the process of measuring a Bragg curve, since a spot that is located on the beam axis is irradiated with the beam, the scanning magnets are not excited. When the proton irradiation system 102 receives the instruction to start the beam irradiation, the system 102 transmits an irradiation start signal to the main control unit 206. When the main control unit 206 receives the irradiation start signal, the unit 206 transmits a measurement start signal to the signal processing unit 205. When the signal processing unit 205 receives the measurement start signal, the unit 205 starts integration of input charges. Immediately after that, the beam that is accelerated by the synchrotron 108 passes through the proton beam transport unit 104 and is extracted from the proton beam transport unit 104 into the rotating irradiation system 105. Finally, the radiation detector 101 is irradiated with the beam under the conditions set on the main control unit 206 by the operator.

When the beam passes through the ionization layer, a plurality of pairs of ions, that is, pairs of positive ions and electrons, are generated in proportion to a beam dose in the ionization layer. The generated pairs of ions are drifted in the direction of the electric field. When the radiation detector 101 is accurately positioned so that the beam axis extends through the centers of the small electrodes 401, ionized electrons that are generated in a first region (described below) reach the small electrodes 401, and ionized electrons that are generated in a second region (described below) reach the large electrodes 402. The first region extends from the beam axis a distance that is almost equal to and smaller than the radius of the small electrode 401. The second region extends from a boundary between the first and second regions a distance that is almost equal to and smaller than a distance calculated by subtracting the radius of the small electrode 401 from the radius of the large electrode 402. Charges are generated in the conductors 404 and 405 (connected to the electrodes 401 and 402) in proportion to the number of the electrons that reach the small electrodes 401 and the large electrodes 402. The signal processing unit 205 independently integrates charges input during the beam irradiation, that is, independently integrates the charges generated in the conductors 404 connected to the small electrodes 401 of the boards A 301 and the charges generated in the conductors 405 connected to the large electrodes 402 of the boards B 302. Therefore, the signal processing unit 205 is required to have two input channels per ionization layer. When the number of ionization layers is 200, the signal processing unit 205 is required to have 400 input channels. In a case of the multilayer radiation detector that requires 64 channels per layer, in order to suppress the number of channels equal to or less than 400, it is necessary that the number of ionization layers be 6 or less.

The sensors for radiation, which each have the ionization layer and the two electrodes between which the ionization layer is arranged, as the present embodiment, are called ionization chambers. The sensor unit 203 according to the present embodiment has a structure in which the ionization chambers are stacked in parallel inlayers in the traveling direction of the beam. The ionization chambers may be replaced with scintillation counters or semiconductor detectors, which generate charges due to radiation irradiation. Specifically, when the sensor unit 203 has a structure in which semiconductor detectors or scintillation counters are stacked in parallel in the traveling direction of the beam, the effect that is the same as the present embodiment can be obtained. In general, the semiconductor detectors are semiconductor devices that each have a P-type semiconductor and an N-type semiconductor, which join each other. When the semiconductor detectors are used as the sensors for radiation, a reverse bias is applied to each of the semiconductor detectors so that a depletion layer is formed in a joint portion of the semiconductor detector. The depletion layers serve as sensitive regions. When radiation is incident on the depletion layer, pairs of holes and electrons are generated in the depletion layer. In this case, the number of the generated pairs of holes and electrons is in proportion to the amount of energy loss. The pairs of holes and electrons are drifted in the direction of an electric field in the semiconductor device. In the same manner as the ionization chambers, the pairs of holes and electrons are output as charges to the signal processing unit 205 from electrodes that are connected to the P-type and N-type semiconductors. The scintillation counters are sensors for radiation, which each include a scintillator (NaI crystal, GSO crystal, organic EL or the like) and a photonic device. The scintillators serve as sensitive regions. When radiation is incident on the scintillator, the scintillator emits scintillation light. In this case, the amount of the emitted scintillation light is in proportion to the amount of energy loss. The photonic device generates charges in proportion to the amount of the emitted scintillation light and outputs the generated charges to the signal processing unit 205.

After the beam irradiation is completed according to the conditions set by the operator, the proton irradiation system 102 transmits an irradiation completion signal to the main control unit 206. When the main control unit 206 receives the irradiation completion signal, the unit 206 transmits a measurement completion signal to the signal processing unit 205. When the signal processing unit 205 receives the measurement completion signal, the unit 205 stops the integration of charges and causes the integrated values to be stored in the main control unit 206 for each of the channels. After the storage is completed, the signal processing unit 205 resets the integrated values of all the channels.

When the integrated values are stored, the main control unit 206 instructs the range shifter drive control unit 202 to insert at least one of the energy absorbers 207. In the present embodiment, the energy absorber 207 that has the thickness of 0.2 mm is first inserted. After the energy absorber 207 is completely inserted, the main control unit 206 instructs the proton irradiation system 102 to restart the beam irradiation under the conditions that have been first set by the operator. The signal processing unit 205 of the radiation detector 101 integrates charges generated in the ionization layers in the same manner as in the first measurement performed under the condition that all the energy absorbers 207 are not arranged on the path of the beam. When the signal processing unit 205 receives the measurement completion signal after the completion of the beam irradiation, the unit 205 stops the integration of charges and causes the integrated value to be stored in the main control unit 206 for each of the channels. After completion of the storage, the signal processing unit 205 resets the integrated values of all the channels. When the main control unit 206 stores the integrated values, the unit 206 instructs the range shifter drive control unit 202 to insert the energy absorber 207 that has the thickness of 0.4 mm. The energy absorber 207 that has the thickness of 0.2 mm is removed from the path of the beam. After the energy absorber 207 that has the thickness of 0.4 mm is completely inserted, the main control unit 206 instructs the proton irradiation system 102 to restart the beam irradiation under the conditions that have been first set by the operator. In order to measure a Bragg curve at measurement intervals of 0.2 mm, the measurement is repeated in this manner while changing, five times, the thickness of the energy absorber 207 to 0.0 mm (in the state in which all the energy absorbers 207 are removed from the path of the beam), 0.2 mm, 0.4 mm, 0.6 mm (in the state in which the two energy absorbers that have the thicknesses of 0.2 mm and 0.4 mm are inserted) and 0.8 mm.

When the inserted energy absorber 207 has a thickness of r, integrated charges obtained from the small electrode 401 that faces the i-th ionization layer counted from a front surface of the sensor unit 203 are indicated by Qs (i, r), and integrated charges obtained from the large electrode 402 that faces the i-th ionization layer counted from the front surface of the sensor unit 203 are indicated by Ql (i, r). After all the measurements are completed while changing the thickness of the energy absorber 207, the main control unit 206 sums Qs (i, r) and Ql (i, r) to obtain Q(i, r). Thus, Q(i, r)=Qs (i, r)+Ql (i, r). The water equivalent thicknesses of the boards A 301, the boards B 302, the ionization layers and the energy absorbers 207 are measured in advance. The main control unit 206 converts Q(i, r) into Q(x) on the basis of the measured water equivalent thicknesses. The symbol x is a depth from the surface of water. In addition, the main control unit 206 multiplies Q(x) by a calibration factor to calculate an absorbed dose D(x) to water. The electrode that is constituted by the small electrode 401 and the large electrode 402 has an area and a shape so that the electrode captures all parts of the beam that spreads according to the two-dimensional normal distribution in the lateral direction and that is used in the scanning method. The number n of particles of the beam that is incident on the ionization layer contacting the small electrode 401 and the large electrode 402 is constant. Therefore, the absorbed dose D(x) to water is finally converted into LET(x) on the basis of an equation of (D(x)=LET(x)×Φ/ρ) and an equation of (Φ=n/S), where S is the area of the electrode that is constituted by the small electrode 401 and the large electrode 402. The number n of the particles can be estimated from accumulated charges of the accelerator. Even if the number n is not clear, a relative distribution of LET(x) can be obtained. The main control unit 206 displays the obtained distribution of LET(x) with respect to x, that is, the Bragg curve on a display (not shown). The operator verifies the Bragg curve displayed on the display and assesses the adjustment result and performance of the proton irradiation system 102.

A process of directly verifying the accuracy of positioning of the radiation detector 101 is described below. The water equivalent thicknesses of the boards A 301, the boards B 302, the ionization layers and the energy absorbers 207 are measured in advance. The main control unit 206 converts Qs(i, r) and Ql(i, r) into Qs(x) and Ql(x) on the basis of the measured water equivalent thicknesses. The symbol x is a depth from the surface of water. As described above, a lateral dose distribution can be approximated using a two-dimensional normal distribution. In addition, each of the electrodes of the boards A 301 has a dual concentric structure. The electrode that is constituted by the small electrode 401 and the large electrode 402 has an area and a shape so that the electrode can capture a sufficient amount of the beam. In this case, when the radiation detector 101 is positioned so that the beam axis extends through the centers of the small electrodes 401 of the layers, Qs(x) and Ql(x) satisfy the following Equation (1).

$$Qs(x)/Ql(x)=1/\exp(-rb0^2/2\sigma(x))-1 \qquad \text{Equation (1)}$$

Where σ(x) is a standard deviation of lateral dose distribution (beam size) in the radiation detector 101 at a position corresponding to a depth x (mm) from the surface of water, and r0 is the radius of the small electrode 401. The main control unit 206 assigns Qs(x) and Ql(x) to Equation (1) to calculate beam size σ(x) and displays the beam size σ(x) as a function of x. Since the beam size σ(x) can be approximated when the beam size σ(x) monotonically quadratically increases with respect to x, it is possible to more accurately verify the accuracy of the positioning on the basis of the distribution profile of the beam size σ(x).

Figure 6A:
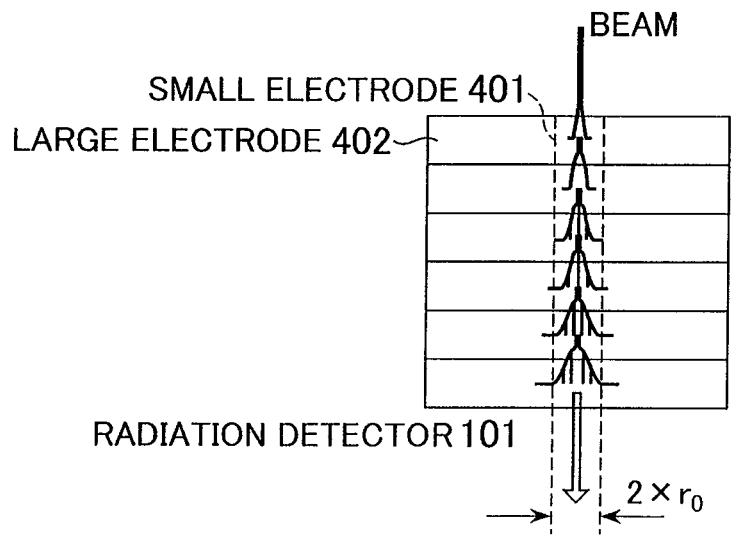
FIG. 6A is an outline diagram showing the state in which the radiation detector measures a beam when the radiation detector is accurately positioned.
Figure 6B:
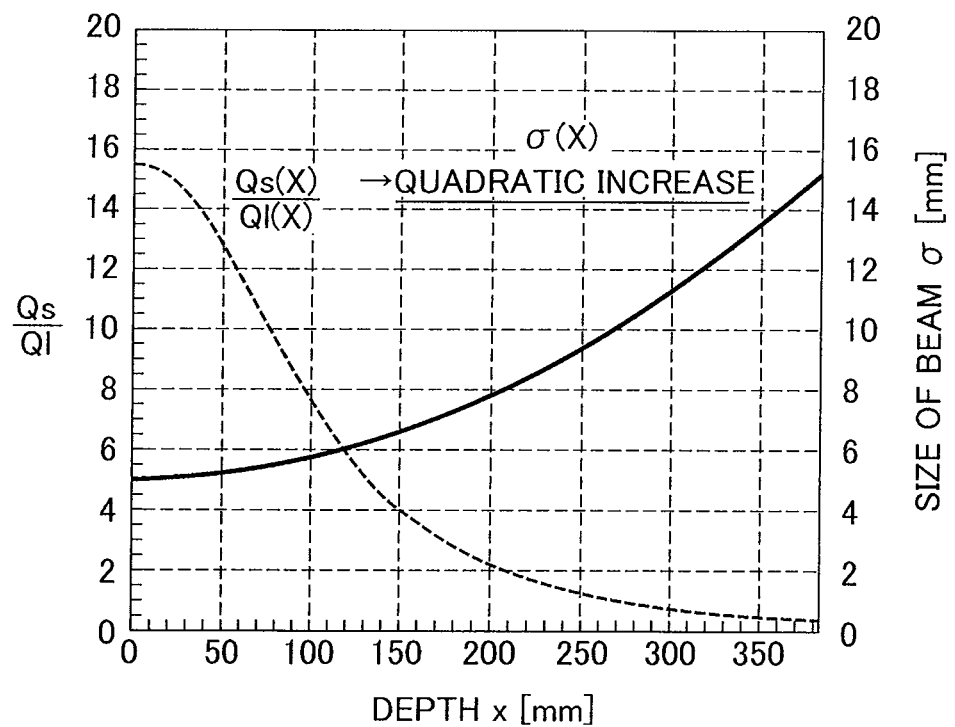
FIG. 6B is a diagram showing a distribution of a beam size $\sigma$ calculated according to Equation (1) in a depth direction in the state shown in FIG. 6A.

For example, as shown in FIG. 6A, when the radiation detector 101 is accurately positioned, that is, when the radiation detector 101 is positioned so that the beam axis extends through the centers of the small electrodes 401 of the layers, the beam that is extracted from the proton irradiation system 102 is incident on the multilayer radiation detector 101 in the direction in which the layers of the radiation detector 101 are stacked, so that the beam is measured by the small electrodes 401 and the large electrodes 402. FIG. 6B shows the beam size σ (recalculated using Equation 1) with respect to x when the radiation detector 101 is accurately positioned. Specifically, FIG. 6B shows results obtained by calculating σ(x) using Equation (1) after calculating Qs(x) and Ql(x) when the radiation detector 101 is accurately positioned. As calculation conditions, the lateral dose distribution is a two-dimensional normal distribution; the beam size σ(x=0 mm) on the surface of the radiation detector 101 is set to 5 mm on the basis of an actual measurement; the beam size σ(x=380 mm) at an end of a range of the beam is set to 15 mm on the basis of a particle transport calculation using Monte Carlo method; and the beam size σ quadratically monotonically increases. In FIG. 6B, since it is possible to verify that the size σ(x) quadratically monotonically increases with respect to x, it can be determined that the positioning is accurately performed.

Figure 7A:
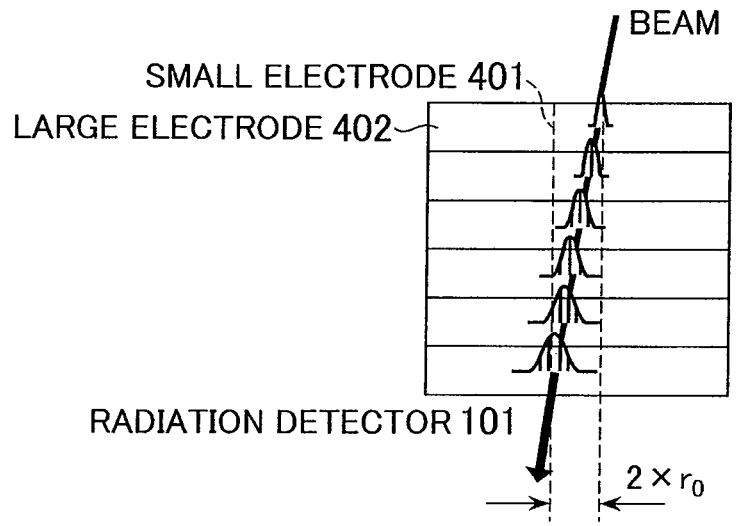
FIG. 7A is an outline diagram showing the state in which the radiation detector measures a beam when the radiation detector is not accurately positioned.
Figure 7B:
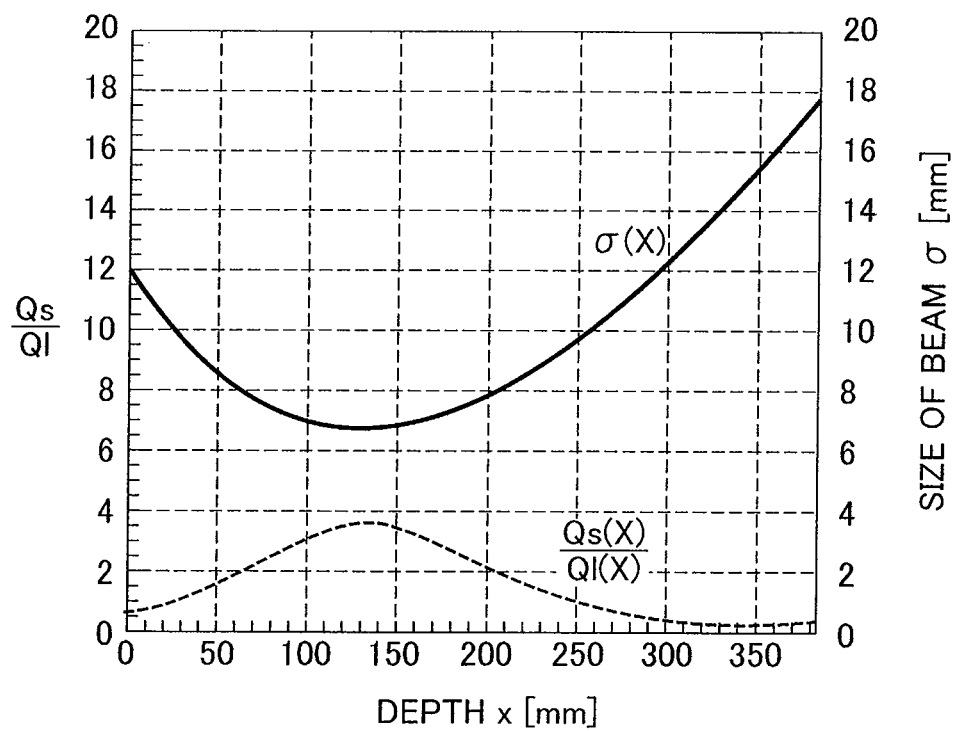
FIG. 7B is a diagram showing a distribution of a beam size $\sigma$ calculated according to Equation (1) in the depth direction in the state shown in FIG. 7A.

On the other hand, as shown in FIG. 7A, when the radiation detector 101 is not accurately positioned, the beam that is extracted from the proton irradiation system 102 is incident on the multilayer radiation detector 101 in a direction oblique to the direction in which the layers of the radiation detector 101 are stacked, so that the beam is measured by the small electrodes 401 and the large electrodes 402. FIG. 7B shows a beam size σ (recalculated using Equation 1) with respect to x when the radiation detector 101 is not accurately positioned. A graph shown in FIG. 7B indicates σ(x) obtained by calculating Qs(x) and Ql(x) that are acquired on the assumption that the radiation detector 101 is not accurately positioned and assigning the calculated Qs(x) and Ql(x) to Equation (1). In FIG. 7B, since it is not possible to verify that the beam size σ(x) quadratically monotonically increases with respect to x, it can be determined that the positioning is not accurately performed. As shown in FIG. 7B, the beam is incident on the radiation detector 101 at a position separated from the center of the small electrode 401 by 12 mm, so that the beam axis is inclined at approximately 2 degrees with respect to a vertical direction.

A process of directly verifying the accuracy of positioning of the radiation detector 101 when the electrodes of the boards A 301 each do not have a dual concentric structure is described. First, the radiation detector 101 is temporarily positioned with reference to the laser marker for positioning of a patient so that the beam axis matches the centers of the small electrodes 401. A radiochromic dosimetry film (not shown) that is capable of measuring a lateral dose distribution is arranged on the upstream side of the radiation detector 101 and measures an incident angle of the beam to the radiation detector 101 and an incident position of the beam. After it is verified, on the basis of the results of the measurement using the film, that the radiation detector 101 is accurately positioned at the aforementioned desired position, the film is removed without a changing in the setting, and the radiation detector 101 is irradiated with the beam again. The ratio of Qs(x) and Ql(x) that are obtained by this irradiation with the beam is stored in the main control unit 206 as reference data.

In order to measure the Bragg curve at the second time or later, the radiation detector 101 is irradiated with the beam under the same conditions as in the measurement of the reference data. However, the film is not arranged. When the ratio of Qs(x) and Ql(x) is equal to the reference data, the positioning of the radiation detector 101 is accurate. After the accuracy of the positioning is verified in this manner, the Bragg curve is measured again under a desired measurement condition. In the first measurement of the Bragg curve, it is necessary to verify the accuracy of the positioning using the film. In the second or later measurement, however, it is possible to verify the accuracy of the positioning only by using the radiation detector 101. In the present embodiment, as a device that allows the operator to directly verify the accuracy of positioning of the radiation detector 101, the radiochromic dosimetry film is used. However, the same effect can be obtained by using any device that is capable of measuring the lateral dose distribution.

A depth dose distribution that is formed during volume irradiation can be measured by using the radiation detector 101 according to the present embodiment. The volume irradiation is to evenly apply a dose to any region of an irradiated body according to the scanning method. A method for measuring the depth dose distribution formed during the volume irradiation by using the radiation detector 101 is described below.

In the same manner as in the measurement of the Bragg curve, the operator carries the radiation detector 101 into the irradiation room and fixes the radiation detector 101 on the couch for patient. Next, the couch is moved with reference to the laser marker so that the radiation detector 101 is temporarily positioned. In the present embodiment, the radiation detector 101 is positioned so that the beam axis extends through the centers of the small electrodes 401 of the layers. After the temporary positioning is completed, the operator moves from the irradiation room into the control room. Then, the operator sets the main control unit 206 to cause the main control unit 206 to transmit a beam start signal. Then, the beam with arbitrary energy is extracted from the proton irradiation system 102 and incident on the radiation detector 101. The radiation detector 101 measures the Bragg curve of the beam. According to the aforementioned procedures, the accuracy of the positioning is determined on the basis of the measurement results. When the positioning is not accurate, the positioning of the radiation detector 101 and the measurement of the Bragg curve are repeated until it is determined that the positioning is accurate. When it is determined that the positioning is accurate, the positioning is completed. After the completion of the positioning, the operator moves from the irradiation room to the control room, and the depth dose distribution formed during the volume irradiation is measured. In order to measure a depth dose distribution on an axis that is parallel to the beam axis and different from the beam axis, the couch for patient is moved in the lateral direction after the completion of the positioning. In the control room, the operator uses the main control unit 206 to control the measurement of the radiation detector 101 and the beam irradiation of the proton irradiation system 102. First, the operator operates the main control unit 206 to turn on the range shifter drive control unit 202, the high voltage power supply 204 and the signal processing unit 205. The operator sets a desired measurement interval on the main control unit 206. In the present embodiment, the measurement interval is set to 0.2 mm.

The measurement starts according to the same procedures as in the measurement of the Bragg curve. The operator uses the main control unit 206 to set irradiation conditions (beam energy, the position of a spot to be irradiated, the number of spots to be irradiated and the like) of the proton irradiation system 102 for volume irradiation and instruct the proton irradiation system 102 to start beam irradiation. A range to be irradiated in the lateral direction during the volume irradiation is set to a range that is sufficiently larger than the area of the small electrode 401 in the lateral direction. When the proton irradiation system 102 receives the instruction to start the beam irradiation, the system 102 transmits the irradiation start signal to the main control unit 206. When the main control unit 206 receives the irradiation start signal, the unit 206 transmits the measurement start signal to the signal processing unit 205. When the signal processing unit 205 receives the measurement start signal, the unit 205 starts integration of charges generated on the input side. Immediately after that, the beam accelerated by the synchrotron 108 passes through the proton beam transport unit 104 and is extracted from the proton beam transport unit 104 into the rotating irradiation system 105. Finally, the radiation detector 101 is irradiated with the beam under the conditions set on the main control unit 206 by the operator. When a certain spot is irradiated with the prescribed amount of radiation, the irradiation is stopped and the beam is controlled to travel toward the next planned spot so that the next planned spot is irradiated with the beam. When the spot to be irradiated with the beam is changed in the lateral direction, the irradiation position of the beam is changed by the scanning magnets. After all spots that are located at a certain depth position are each irradiated with the prescribed amount of radiation, a spot to be irradiated is changed in the depth direction. In order to change the spot (to be irradiated) in the depth direction, the energy of the beam is changed by the accelerator or the range shifter. Finally, all the spots are each irradiated with the same dose.

After the volume irradiation is performed under the conditions set by the operator and completed, the proton irradiation system 102 transmits the irradiation completion signal to the main control unit 206. When the main control unit 206 receives the irradiation completion signal, the unit 206 transmits the measurement completion signal to the signal processing unit 205. When the signal processing unit 205 receives the measurement completion signal, the unit 205 stops the integration of charges and causes the integrated value to be stored in the main control unit 206 for each of the channels. After the storage is completed, the signal processing unit 205 resets the integrated values of all the channels.

After the main control unit 206 stores the integrated values, the main control unit 206 instructs the range shifter drive control unit 202 to insert at least one of the energy absorbers 207. In the present embodiment, the energy absorber 207 that has the thickness of 0.2 mm is first inserted. When the energy absorber 207 is completely inserted, the main control unit 206 instructs the proton irradiation system 102 to restart the volume irradiation under the conditions that have been first set by the operator. In the same manner as in the measurement performed under the condition that all the energy absorbers 207 are removed from the path of the beam, the signal processing unit 205 of the radiation detector 101 integrates charges generated in the ionization layers. When the signal processing unit 205 receives the measurement completion signal after the completion of the beam irradiation, the unit 205 stops the integration of charges and newly causes the integrated value to be stored in the main control unit 206 for each of the channels. After the storage is completed, the signal processing unit 205 resets the integrated values of all the channels. After the main control unit 206 stores the integrated values, the unit 206 instructs the range shifter drive control unit 202 to insert the energy absorber 207 that has the thickness of 0.4 mm. The energy absorber 207 that has the thickness of 0.2 mm is removed from the path of the beam. After the energy absorber 207 that has the thickness of 0.4 mm is completely inserted, the main control unit 206 instructs the proton irradiation system 102 to restart the volume irradiation under the conditions that have been first set by the operator. Since a depth dose distribution is measured at the measurement intervals of 0.2 mm, the measurement is repeated five times while changing the thickness of the energy absorber 207 to 0.0 mm (in the state in which all the energy absorbers 207 are removed from the path of the beam) 0.2 mm, 0.4 mm, 0.6 mm (in the state in which the two energy absorbers 207 that have the thicknesses of 0.2 mm and 0.4 mm are inserted) and 0.8 mm.

In the same manner as in the measurement of the Bragg curve, the main control unit 206 calculates $Q_s(x)$ from the measurement results. The areas of the small electrodes 401 are sufficiently smaller than a range to be irradiated (during the volume irradiation) in the lateral direction. A dose that is obtained by the measurement is equivalent with a local dose at the centers of the small electrodes 401 in the radiation detector 101. The main control unit 206 converts the calculated $Q_s(x)$ into an absorbed dose $D_s(x)$ to water and displays the depth dose distribution with respect to x on the display. By verifying the depth dose distribution displayed on the display, the operator assesses the result of adjustment of the proton irradiation system 102 and the performance of the proton irradiation system 102.

The radiation detector 101 according to the present embodiment is configured so that the installed position of the radiation detector 101 relative to the beam axis can be verified. Thus, the Bragg curve of the beam can be more accurately measured.

The radiation detector 101 according to the present embodiment is configured so that the installed position of the radiation detector 101 relative to the beam axis can be verified without an increase in the number of charge collection channels. Thus, it is possible to reduce the cost of the multilayer radiation detector. In addition, in the scanning method, when the radiation detector 101 is positioned so that the beam axis extends through the centers of the small electrodes 401 of the layers, the beam size can be measured without an increase in the number of charge collection channels. Thus, the cost of the multilayer radiation detector can be reduced.

When the depth dose distribution is measured using the radiation detector 101 according to the present embodiment, even if the beam extracted from the irradiation system is a photon beam, an electron beam, a muon beam, a pion beam, a neutron beam or the like, the same effect can be obtained.

Second Embodiment

Next, the radiation detector according to the second embodiment of the present invention is described.

The radiation detector 101 according to the second embodiment can measure a depth dose distribution formed in water by a scattering method. The proton irradiation system according to the second embodiment has a similar structure to the proton irradiation system 102 according to the first embodiment. Only the structure of the irradiation nozzle 110 according to the second embodiment is slightly different from that according to the first embodiment. The second embodiment is described with reference to the drawings used to describe the first embodiment.

The outline of the scattering method that is achieved by the irradiation nozzle 110 according to the present embodiment is described using a wobbling method that is a representative example of the scattering method. The irradiation nozzle 110 has the scanning magnets in the same manner as the first embodiment. In addition, the irradiation nozzle 110 according to the present embodiment includes a scatterer, a collimator, a bolus and a spread-out Bragg peak formation filter (not shown).

A method for forming a uniform lateral dose distribution is described. Alternating currents that appropriately vary with time are supplied from a scanning magnet power supply (not shown) to the scanning magnets on the basis of the target volume and incident energy of the beam. Specifically, the alternating currents are supplied from the scanning magnet power supply to the scanning magnets so that positive and negative half cycles of each of the alternating currents periodically change, the phase of the alternating current is shifted by 90 degrees for each of the scanning magnets and the maximum values of the alternating currents are equal to each other in order to scan the target volume with the beam in a circle. The maximum current values determine the scanning range of the beam. In addition, in order to control the amount of the beam to be scattered, the scatterer is arranged on the path of the beam. The collimator can move according to the target shape in an appropriate manner. Thus, the amount of radiation with which a region other than the target volume is irradiated is reduced. As a result, the irradiation dose is concentrated on the set target volume, and an irradiation field with a highly uniform dose distribution is formed. As the method for forming a uniform lateral dose distribution, a double scattering method in which two scatterers are arranged on the path of the beam instead of the scanning magnets is effective.

Next, a method for forming a uniform depth dose distribution is described. The energy of the beam is changed by the synchrotron or the like on the basis of the depth position of the target volume so that the depth position at which the beam reaches matches the depth position of the target volume. In addition, the bolus is appropriately selected on the basis of the target shape. The spread-out Bragg peak formation filter (hereinafter abbreviated as SOBP filter) is appropriately selected according to the target volume and the incident energy of the beam. The SOBP filter is arranged on the path of the beam. A function of the SOBP filter is described. The SOBP filter has a step-like structure with steps that has different thicknesses and through which the beam passes. The beam with an appropriate amount passes through each of the steps of the SOBP filter so that the energy of the beam is changed from single energy to energy with an appropriate energy distribution, and a sharp Bragg peak formed in the depth direction by the single-energy particle beam increases on the basis of the target shape. The SOBP filter is called a ridge filter. In the present embodiment, the ridge filter is used as the SOBP filter as an example. A range modulation wheel may be used instead of the ridge filter.

A method for measuring a depth dose distribution (formed by the scattering method) by using the radiation detector 101 is described. In the same manner as the first embodiment, the operator carries the radiation detector 101 into the irradiation room and fixes the radiation detector 101 on the couch for patient. Next, the couch is moved with reference to the laser marker so that the radiation detector 101 is temporarily positioned. In the present embodiment, the radiation detector 101 is positioned so that the beam axis extends through the centers of the small electrodes 401 of the layers. After the temporary positioning is completed, the operator moves from the irradiation room to the control room. In addition, the scatterer, the collimator, the bolus and the spread-out Bragg peak formation filter, which are included in the irradiation nozzle 110, are removed from the path of the beam. Furthermore, the scanning magnets are not excited. After the removal, the Bragg curve is measured with any beam energy in the same manner as the first embodiment. According to the procedures described in the first embodiment, the accuracy of the positioning is determined on the basis of the measurement results. When the positioning is not accurate, the positioning of the radiation detector 101 and the measurement of the Bragg curve are repeated until it is determined that the positioning is accurate. When it is determined that the positioning is accurate, the positioning is completed. After the completion of the positioning, the operator moves from the irradiation room into the control room, and the depth dose distribution formed in the scanning method is measured. In order to measure a depth dose distribution on an axis that is different from the beam axis, the couch for patient is moved in the lateral direction after the completion of the positioning. In the control room, the operator uses the main control unit 206 to control the measurement of the radiation detector 101 and the beam irradiation of the proton irradiation system 102. First, the operator operates the main control unit 206 to turn on the range shifter drive control unit 202, the high voltage power supply 204 and the signal processing unit 205. The operator sets a desired measurement interval on the main control unit 206. In the present embodiment, the measurement interval is set to 0.2 mm.

In the present embodiment, the depth dose distribution of the beam is measured in the same manner as in the volume irradiation described in the first embodiment. The operator uses the main control unit 206 to set irradiation conditions (beam energy, the width of a spread-out Bragg peak, the shape of the collimator, the thickness of the scatterer and the like) of the proton irradiation system 102 and instruct the proton irradiation system 102 to start the beam irradiation. The scatterer, the collimator and the spread-out Bragg peak formation filter, which correspond to the set irradiation conditions, are inserted in and arranged on the beam path in the irradiation nozzle 110. When the bolus is used, the operator directly attaches the bolus to the irradiation nozzle 110. The alternating currents that appropriately vary with time are supplied from the scanning magnet power supply to the scanning magnets according to a range to be irradiated and the beam energy. A range to be irradiated in the lateral direction is sufficiently larger than the area of the small electrode 401 in the lateral direction. When the proton irradiation system 102 receives the instruction to start the beam irradiation, the system 102 transmits the irradiation start signal to the main control unit 206. When the main control unit 206 receives the irradiation start signal, the unit 206 transmits the measurement start signal to the signal processing unit 205. When the signal processing unit 205 receives the measurement start signal, the unit 205 starts integration of charges generated in the input side. Immediately after that, the beam accelerated by the synchrotron 108 passes through the proton beam transport unit 104 and is extracted from the proton beam transport unit 104 into the rotating irradiation system 105. Finally, the radiation detector 101 is irradiated with the beam under the conditions set on the main control unit 206 by the operator.

After the irradiation is performed under the conditions set by the operator and completed, the proton irradiation system 102 transmits the irradiation completion signal to the main control unit 206. When the main control unit 206 receives the irradiation completion signal, the main control unit 206 transmits the measurement completion signal to the signal processing unit 205. When the signal processing unit 205 receives the measurement completion signal, the signal processing unit 205 stops the integration of charges and causes the integrated value to be stored in the main control unit 206 for each of the channels. After the storage is completed, the signal processing unit 205 resets the integrated values of all the channels.

When the main control unit 206 stores the integrated values, the unit 206 instructs the range shifter drive control unit 202 to insert at least one of the energy absorbers 207. In the present embodiment, the energy absorber 207 that has the thickness of 0.2 mm is first inserted. After the energy absorber 207 is completely inserted, the main control unit 206 instructs the proton irradiation system 102 to restart the irradiation under the conditions that have been first set by the operator. The signal processing unit 206 of the radiation detector 101 integrates charges generated in the ionization layers in the same manner as in the first measurement performed under the condition that all the energy absorbers 207 are removed from the path of the beam. When the signal processing unit 205 receives the measurement completion signal after completion of the beam irradiation, the unit 205 stops the integration of charges and newly causes the integrated value to be stored in the main control unit 206 for each of the channels. After the storage is completed, the signal processing unit 205 resets the integrated values of all the channels. After the main control unit 206 stores the integrated values, the unit 206 instructs the range shifter drive control unit 202 to insert the energy absorber 207 that has the thickness of 0.4 mm. The energy absorber 207 that has the thickness of 0.2 mm is removed from the path of the beam. After the energy absorber 207 that has the thickness of 0.4 mm is completely inserted, the main control unit 206 instructs the proton irradiation system 102 to restart the irradiation under the irradiation conditions that have been first set by the operator. Since the depth dose distribution is measured at the measurement intervals of 0.2 mm, the measurement is repeated five times while changing the thickness of the energy absorber 207 to 0.0 mm (in the state in which all the energy absorbers 207 are removed from the path of the beam), 0.2 mm, 0.4 mm, 0.6 mm (in the state in which the two energy absorbers 207 that have the thicknesses of 0.2 mm and 0.4 mm are inserted) and 0.8 mm.

In the present embodiment, the main control unit 206 calculates $Qs(x)$ from the measurement results in the same manner as the first embodiment. The areas of the small electrodes 401 are sufficiently smaller than a range to be irradiated in the lateral direction. A dose that is obtained by the measurement is equivalent with a local dose of the centers of the small electrodes 401 in the radiation detector 101. The main control unit 206 converts the calculated $Qs(x)$ into an absorbed dose $Ds(x)$ to water and displays the depth dose distribution with respect to x on the display. By verifying the depth dose distribution displayed on the display, the operator assesses the result of adjustment and the performance of the proton irradiation system 102.

The radiation detector 101 according to the present embodiment is configured so that the installed position of the radiation detector 101 relative to the beam axis can be verified. Thus, the Bragg peak of the beam can be more accurately measured.

The radiation detector 101 according to the present embodiment is configured so that the installed position of the radiation detector 101 relative to the beam axis can be verified without an increase in the number of charge collection channels. Thus, the cost of the multilayer radiation detector can be reduced. In addition, in the scanning method, when the radiation detector 101 is positioned so that the beam axis extends through the centers of the small electrodes 401 of the layers, the beam size of the dose distribution can be measured without an increase in the number of charge collection channels. Thus, the cost of the multilayer radiation detector can be reduced.

When the depth dose distribution is measured using the radiation detector 101 according to the present embodiment, even if the beam extracted from the irradiation system is a photon beam, an electron beam, a muon beam, a pion beam, a neutron beam or the like, the same effect can be obtained.

What is claimed is:

1. A radiation detector comprising:
   a plurality of sensors which are responsive to radiation, where the sensors include first electrodes and second electrodes, the first electrodes each extracting a signal that is based on radiation measured at a central region, the second electrodes each extracting a signal that is based on radiation measured at another region surrounding the central region; and
   a signal processing unit for measuring a depth dose distribution of the radiation on the basis of the detection signals output from the first electrodes and measuring a Bragg curve of the radiation on the basis of the detection signals output from the first and second electrodes which capture the radiation that spreads in a lateral direction.

2. The radiation detector according to claim 1, wherein the sensors are ionization chambers.

3. The radiation detector according to claim 1, wherein the sensors are semiconductor detectors that each generate a current due to radiation.

4. The radiation detector according to claim 1, wherein the sensors are scintillation counters.

5. The radiation detector according to any of claims 1 to 4, wherein the signal processing unit determines, on the basis of the detection signals output from the first and second electrodes, whether or not the radiation detector is arranged at a predetermined position.

6. The radiation detector according to claim 5, wherein the signal processing unit calculates a beam size of the radiation on a flat surface perpendicular to the traveling direction of the radiation on the basis of a ratio of the detection signals output from the first electrodes and the detection signals output from the second electrodes and determines, on the basis of the calculation results, whether or not the radiation detector is arranged at the predetermined position.

7. The radiation detector according to claim 6, wherein the signal processing unit determines that the radiation detector is arranged at the predetermined position when the calculated beam size of the radiation on the flat surface perpendicular to the traveling direction of the radiation quadratically increases in the traveling direction of the beam.

8. The radiation detector according to claim 7, wherein the signal processing unit causes the ratio of the detection signals output from the first electrodes and the detection signals output from the second electrodes, the ratio being used to determine that the radiation detector is arranged at the predetermined position, to be stored in a storage unit, and
   after the storage of the ratio, the signal processing unit compares the stored ratio with the ratio of detection signals newly output from the first electrodes and detection signals newly output from the second electrodes to determine whether or not the radiation detector is arranged at the predetermined position.

9. A method for detecting radiation by a radiation detector which includes: a plurality of sensors which react to the radiation and are stacked in parallel in layers in a traveling direction of the radiation; and a signal processing unit which processes detection signals output from first electrodes and detection signals output from second electrodes to measure a distribution of the radiation, where a first electrode and a second electrode are included in each of the sensors, the method comprising the step of:

extracting with the first electrodes a signal that is based on radiation measured at a central region of the sensor; and extracting with the second electrodes a signal that is based on radiation measured at another region surrounding the central region; and measuring with the signal processing unit a depth dose distribution of the radiation on the basis of the detection signals output from the first electrodes and a Bragg curve of the radiation on the basis of the detection signals output from the first electrodes and the detection signals output from the second electrodes which capture the radiation that spreads in a lateral direction.

10. The method according to claim 9, wherein the signal processing unit calculates a beam size of the radiation on a flat surface perpendicular to the traveling direction of the radiation on the basis of the ratio of the detection signals output from the first electrodes and the detection signals output from the second electrodes and determines, on the basis of the calculation results, whether or not the radiation detector is arranged at the predetermined position.

11. The method according to claim 10, wherein the signal processing unit determines that the radiation detector is arranged at the predetermined position when the calculated beam size of the radiation on the flat surface perpendicular to the traveling direction of the radiation quadratically increases in the traveling direction of the beam.

12. The method according to claim 11, wherein the signal processing unit causes the ratio of the detection signals output from the first electrodes and the detection signals output from the second electrodes, the ratio being used to determine that the radiation detector is arranged at the predetermined position, to be stored in a storage unit, and after the storage of the ratio, the signal processing unit compares the stored ratio with the ratio of detection signals newly output from the first electrodes and detection signals newly output from the second electrodes to determine whether or not the radiation detector is arranged at the predetermined position.

13. The method according to claim 9, wherein the signal processing unit determines, on the basis of the detection signals output from the first and second electrodes, whether or not the radiation detector is arranged at a predetermined position, and measures the depth dose distribution and the Bragg curve of the radiation.

* * * * *